Nov. 29, 1949     B. R. NYHAGEN     2,489,321
VIOLIN SHOULDER REST
Filed May 24, 1947
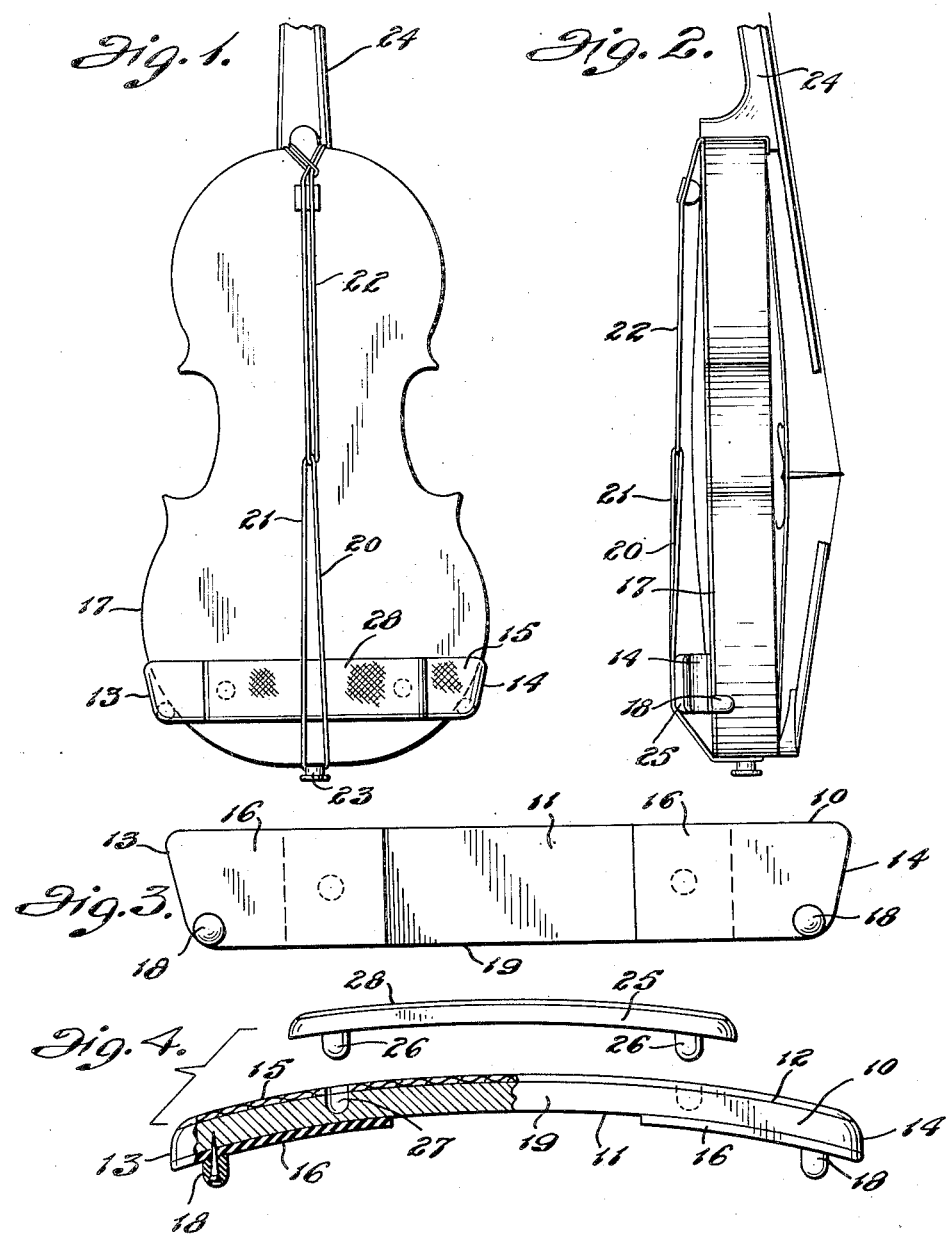
INVENTOR.
BARNEY R. NYHAGEN
BY Clark & Ott
ATTORNEYS Patented Nov. 29, 1949

2,489,321

UNITED STATES PATENT OFFICE 2,489,321

VIOLIN SHOULDER REST

Barney R. Nyhagen, New York, N. Y.

Application May 24, 1947, Serial No. 750,342

2 Claims. (Cl. 84—280)

1

This invention relates to shoulder rests for violins and the same has particular reference to an improved shoulder rest adapted to support a violin in playing position upon the shoulder and which does not interfere with or dampen the tonal vibrations of the violin.

The invention comprehends a shoulder rest of elongated narrow configuration which is adapted to underlie and extend laterally across the violin adjacent the rear thereof and to comfortably fit the depression between the collarbone and the base of the neck so as to provide a support by means of which the violin may be retained in position by relative light pressure of the chin against the upper surface of the violin.

The invention also has for an object the provision of a shoulder rest of said character having resilient supporting engagement with opposite rim portions of the violin whereby the rest does not interfere with the free vibration of the bottom wall of the violin.

The invention has for a further object the provision of means for retaining the support in position on the underside of the violin and which permits of the adjustment of the rest for varying the location thereof on the violin.

With the foregoing and other objects in view, reference is now made to the following specification and accompanying drawings in which the preferred embodiment of the invention is illustrated.

In the drawings:

Fig. 1 is a fragmentary plan view of the underside of a violin with a shoulder rest constructed in accordance with the invention arranged in position thereon.

Fig. 2 is a side view thereof.

Fig. 3 is an enlarged top plan view of the rest.

Fig. 4 is a side view thereof with parts shown in separated juxtaposition and partly in section.

Referring to the drawings by characters of reference, the shoulder rest may be fashioned from wood, light metal, synthetic plastics or equivalent rigid material so as to provide a firm support for a violin. The rest is of a size and shape to comfortably fit the hollow or fleshy portion of the shoulder between the collar bone and the base of the neck. As illustrated, the rest consists of a body 10 of longitudinal arcuate formation having upper and lower surfaces 11 and 12 of concavo-convex formation in longitudinal cross-sectional configuration. The rest is of relatively narrow formation in relation to its width with the opposite end edges 13 and 14 converging rearwardly.

The convex lower surface 12 of the body 10 is preferably provided with a soft compressible fabric covering 15 which is adhesively bonded thereto so as to provide a soft finish for the lower face of the rest which engages in the hollow of the shoulder between the collarbone and the base of the neck. The upper surface 11 of the rest is provided with a layer 16 of cushioning material such as soft compressible rubber which extends over the upper surface thereof adjacent the opposite ends and which is adapted to engage with the raised rim 17 extending about the underside of the violin so as to resiliently support the violin thereon and maintain the end wall of the violin in spaced relation from the top wall of the rest so that the same does not interfere with or dampen the tonal vibrations of the violin.

The rest is provided with knobs 18 adjacent the junctures of the rear longitudinal edge 19 with the opposite end edges 13 and 14 and which knobs are secured to the upper face of the rest so as to form abutments which engage against the outwardly extending bead defined by the rim 17 of the violin when the rest is arranged in position thereon. A retaining member 20 is provided consisting of connected band members 21 and 22, the member 21 being an elastic band and engaging over the button 23 of the violin while the band member 22 consists of a cord and is looped about the neck 24 of the violin.

In order to support the violin at a higher elevation on the shoulder, the rest may include a supplemental member 25 of longitudinal arcuate formation corresponding to that of the body 10 and having lugs 26 adjacent the opposite ends thereof which are adapted to engage in sockets 27 in the lower face of the body 10 for securing the member 25 to the lower surface thereof. The supplemental member 25 may also have a soft compressible fabric covering 28 secured to the lower surface thereof so as to form a soft facing for the underside of the rest.

This construction permits of the convenient adjustment of the rest longitudinally of the retaining member 20 and at relative angular positions with reference thereto so that the same may be disposed on the underside of the violin at any desired location adjacent the rear thereof to comfortably support the violin on the shoulder of the player. The retaining member 20 may be retained in position at all times on the violin and when the violin is to be played the rest may be inserted between the elastic band 21 and the violin and disposed in the desired position on the violin.

What is claimed is:

1. In a shoulder rest for a violin, an elongated body of longitudinal arcuate formation, a layer of resilient material secured to the upper surface of the body adjacent the opposite ends thereof and adapted when the violin is in position on the rest to engage with oppositely disposed portions of the rim of the bottom wall of the violin with the upper surface of the rest disposed in spanning relation with the violin between said points of engagement, resilient knobs secured to the upper side of said body adjacent the opposite ends thereof and adapted to engage against the side edges of the rim of the bottom wall of the violin, a supplemental member of longitudinal arcuate formation and interengageable lugs and sockets forms respectively on said supplemental member and in said body for securing the supplemental member to the lower surface of the body.

2. In a shoulder rest for a violin, an elongated body of longitudinal arcuate formation, a layer of resilient material secured to the upper surface of the body adjacent the opposite ends thereof and adapted when the violin is in position on the rest to engage with oppositely disposed portions of the rim of the bottom wall of the violin with the upper surface of the rest disposed in spanning relation with the violin between said points of engagement, resilient knobs secured to the upper side of said body adjacent the opposite ends thereof and adapted to engage against the side edge of the rim of the bottom wall of the violin, a fabric covering secured to the lower surface of the body to thereby provide a soft finish for engagement against the shoulder of the player and an elastic retaining member extending over the under surface of the body and engaging at the ends thereof about the neck of the violin and about the button thereof for retaining the rest in position on the violin.

BARNEY R. NYHAGEN.

REFERENCES CITED

The following references are of record in the file of this patent:

UNITED STATES PATENTS

| Number | Name | Date |
| --- | --- | --- |
| 2,064,925 | Kolitsch | Dec. 22, 1936 |